United States Patent

Hsieh

[19]

[11] Patent Number: 5,961,256
[45] Date of Patent: Oct. 5, 1999

[54] ROUGH BORING TOOL HAVING MEANS TO SHOW MICROADJUSTABLE BORING HOLE DIAMETER MACHINING QUANTITY

[76] Inventor: Ho-Shun Hsieh, 50-1, Nan Shing, Lu Charng Li, Shi Luo Town, Yun Lin Shian, Taiwan

[21] Appl. No.: 09/182,783

[22] Filed: Oct. 30, 1998

[30] Foreign Application Priority Data

Feb. 21, 1998 [TW] Taiwan .................................. 87202554

[51] Int. Cl.⁶ .................................................. B23B 29/02
[52] U.S. Cl. ........................... 408/16; 408/147; 408/186; 408/713
[58] Field of Search ............................ 408/16, 146, 147, 408/153, 181, 186, 713

[56] References Cited

U.S. PATENT DOCUMENTS

| | | | |
|---|---|---|---|
| 594,615 | 11/1897 | Fowle | 408/181 |
| 722,481 | 3/1903 | Beyer | 408/186 |
| 1,336,311 | 4/1920 | Martin | 408/16 |
| 1,398,070 | 11/1921 | Doyle | 408/186 |
| 1,740,055 | 12/1929 | Abramson | 408/181 |
| 2,350,019 | 5/1944 | Dexter | 408/186 |
| 2,466,233 | 4/1949 | Harris, Sr. | 408/186 |
| 4,248,555 | 2/1981 | Satou | 408/186 |
| 4,260,303 | 4/1981 | Newman | 408/181 |
| 4,507,027 | 3/1985 | Adamson et al. | 408/186 |
| 5,396,693 | 3/1995 | Lohner . | |
| 5,421,681 | 6/1995 | Stephens . | |

*Primary Examiner*—Daniel W. Howell
*Attorney, Agent, or Firm*—David and Raymond; Raymond Y. Chan

[57] ABSTRACT

A rough boring tool is composed of a boring rod having a tool hole which is provided with a base line and a plurality of reading scales. The rough boring tool is further composed of a boring tool engaged with the tool hole and provided with a plurality of measuring scales corresponding in location to the reading scales and forming an angle with the base line. The advancement quantity of the boring tool can be easily observed with the naked eye by converging the reading scales of the tool hole of the boring rod and the measuring scales of the boring tool.

9 Claims, 6 Drawing Sheets

FIG. 1 (PRIOR ART)
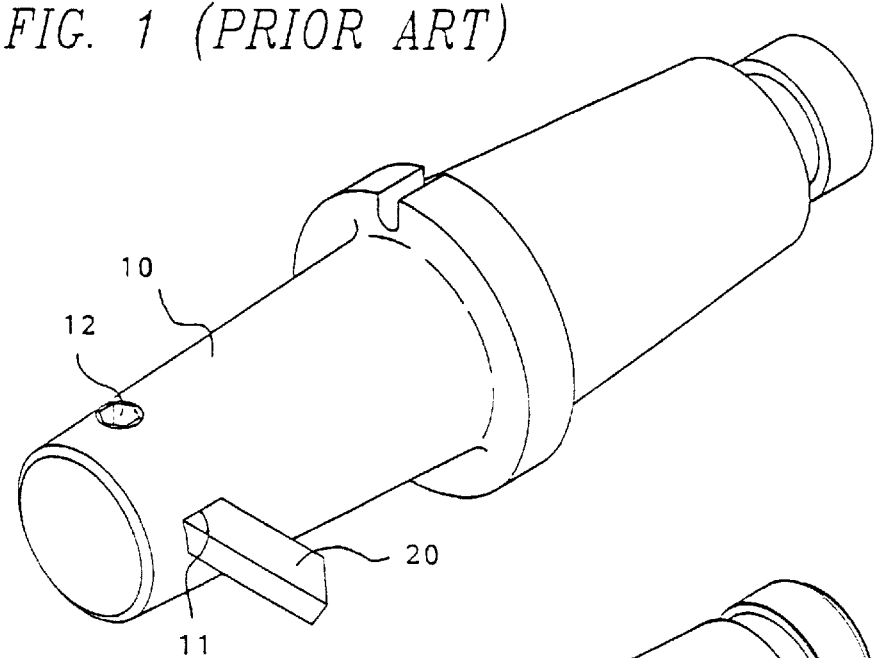
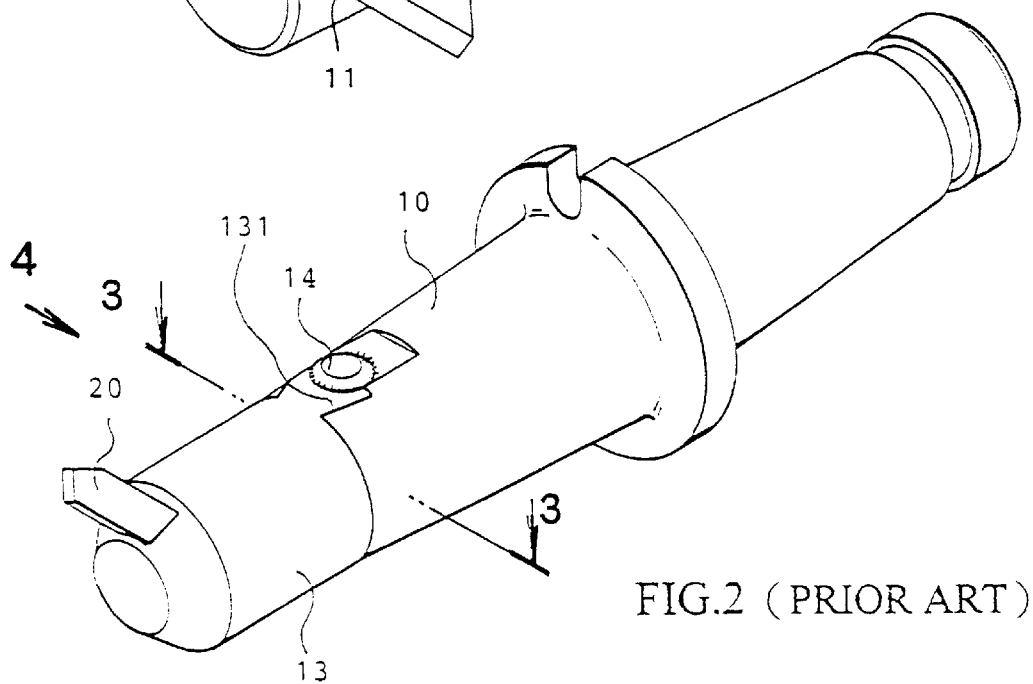
FIG.2 (PRIOR ART)
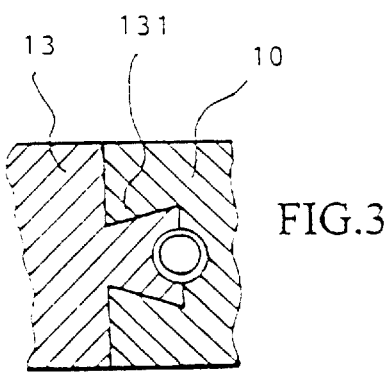
FIG.3 (PRIOR ART)

ROUGH BORING TOOL HAVING MEANS TO SHOW MICROADJUSTABLE BORING HOLE DIAMETER MACHINING QUANTITY

BACKGROUND OF THE PRESENT INVENTION

As shown in FIG. 1, a rough boring tool of the prior art is mounted on a boring machine or milling machine for doing a rough machining and is provided with a boring rod 10 which is engageable with a tool rotating seat (not shown in the drawing) and is provided in the vicinity of the tail end thereof with a tool hole 11 in which a boring hole tool 20 is fitted in conjunction with a fastening element 12, such as a screw. The prior art boring tool is devoid of a displacement indicating device as well as a feeding adjustment device and is therefore incapable of a direct on-line adjustment in the midst of operation. It is thus necessary to measure the size of the first test boring prior to a visual feeding adjustment of the boring hole tool 20. Such visual adjustment often results in an inaccurate displacement of the boring hole tool 20 on the boring rod 10. In addition, such visual adjustment must be done repeatedly for several times and is thus rather time-consuming.

As shown in FIGS. 2–4, a prior art boring tool is provided at the tail end of a boring rod 10 thereof with a sliding tool seat 13 which is movably fastened therewith. Located between them are dovetail slots 131 by means of which a micro adjusting element 14, such as a bolt, is disposed. As the microadjusting element 14 is turned, the boring rod 10 and the sliding tool seat 13 are driven to displace radially to attain an advancing quantity P, thereby resulting in a radial displacement of the sliding tool seat 13 on the boring rod 10. In the meantime, the microadjusting element 14 is provided in the outer end thereof with the equally-graduated data 15 for detecting the advancement quantity P of the tool.

Such a structure as described above is defective in design in that the advancement quantity is confined by the length of the microadjusting element 14, thereby resulting in a limited advancement quantity of the machining. The adjustment of the machining advancement quantity must be done in a step-by-step manner, as shown in FIG. 4. In other words, a fastening element 141 of the microadjusting element 14 must be first loosened so as to enable the microadjusting element 14 to be reset at zero. Thereafter, a tool bolt 142 is loosened such that the boring tool 20 is advanced appropriately, and that the tool blot 142 is tightened once again to fasten securely the boring tool 20, and further that the boring tool 20 is displaced by the microadjusting element 14. Such an adjustment of the boring tool 20 as described above must be carried out repeatedly and is thus time-consuming and inefficient. In addition, the engagement of the tool is attained by an excess of elements such that the structural rigidity of the tool is seriously undermined, and that the dovetail slots 131 are vulnerable to crack. Moreover, the microadjusting element 14 is vulnerable to metal fatigue after a prolonged use, thereby resulting in discrepancy between the quantity of a displacement that has taken place actually, and the quantity that is shown by the graduations.

The boring tools disclosed by the U.S. Pat. Nos. 5,396,693; 5,611,651; 5,421,681 and 5,427,480 are suitable for use in finish boring. The microadjustment of the tool advancement is achieved by the thread rotation. The microadjusting elements of these prior art boring tools are similar in construction to that which is described above with reference to FIGS. 2–4. In other words, the microadjusting elements of the prior art are prone to become loosened and are complicated in construction. In addition, such microadjusting elements of the prior art have a low rigidity and are not cost-effective.

SUMMARY OF THE PRESENT INVENTION

It is therefore the primary objective of the present invention to provide an improved boring tool free from the drawbacks of the prior art boring tools described above.

In keeping with the principle of the present invention, the foregoing objective of the present invention is attained by the boring tool which is provided in the base line of the slide tool seat thereof with a graduation scale of an angle ranging between 0° and 90°, or 90° and 180°. The boring tool is similarly provided with the graduation scale. The small angle denotes a precision adjustment. The boring tool and the slide tool seat are displaced such that the variation is attained by a unit point converging position, and that the extent of the displacement can be easily read by the naked eye, thereby eliminating the repeated adjustments of the boring tool.

The foregoing objective, features, functions, and advantages of the present invention will be more readily understood open a thoughtful deliberation of the following detailed description of the preferred embodiments of the present invention with reference to the accompanying drawings.

BRIEF DESCRIPTION OF THE DRAWINGS

FIG. 1 shows a schematic view of a boring tool of the prior art.

FIG. 2 shows a perspective view of another boring tool of the prior art.

FIG. 3 shows a sectional plan view of the boring tool as shown in FIG. 2.

DETAILED DESCRIPTION OF THE PREFERRED EMBODIMENTS

Figure 4:
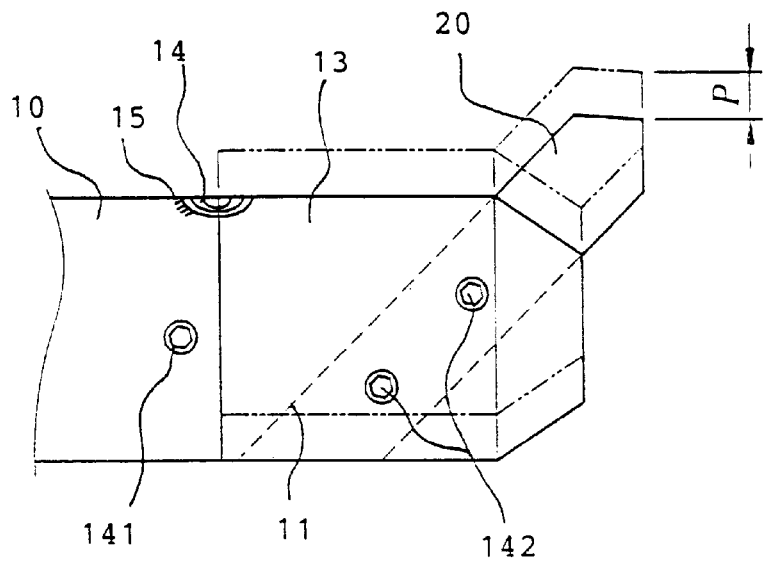
FIGS. 4 A and B are action variation views taken along the direction indicated by in FIG. 2.
Figure 4:
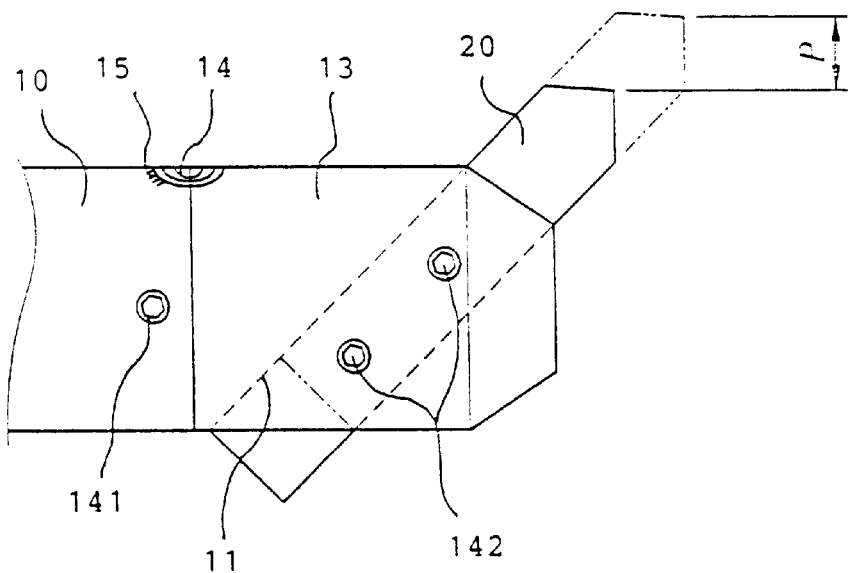
Figure 5A:
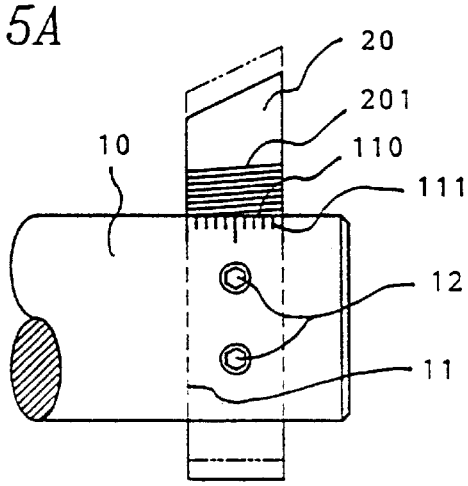
FIG. 5A shows a side plan view of a first preferred embodiment of the present invention.
Figure 5B:
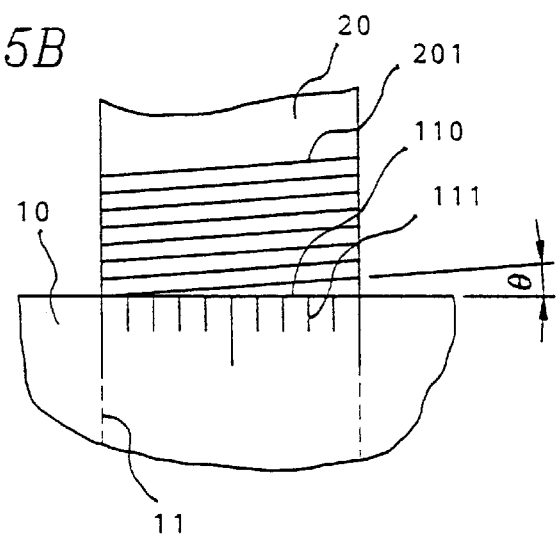
FIG. 5B shows a partial enlarged view of the present invention as shown in FIG. 5A.

As shown in FIGS. 5A and 5B, a rough boring tool embodied in the present invention is composed of a boring rod 10 and a boring tool 20.

The boring rod 10 is provided in one side of the tail end thereof with at least one tool hole 11 engageable with the boring tool 10. The tool hole 11 is provided at the end thereof with a base line 110 facing the tool blade and having graduation scales 110 at an interval, such as 1 mm.

The boring tool 20 is fitted into the tool hole 11 and is provided in the surface thereof with graduation scales 201 at an interval, such as 1 mm. The graduation scales 201 form with the base line 110 angles θ ranging between 0° and 90°, or 90° and 180°. The small angle θ denotes a precision adjustment.

The boring tool 20 is secured to the tool hole 11 by a fastening element 12.

The boring tool 20 is capable of displacing in the tool hole 11 such that the hole diameter machining quantity can be easily read with the naked eye in conjunction with the graduation scale 201 and 111.

For example, one degree of the graduation scale 201 is converged with one degree of the graduation scale 111, the tool is considered being reset to zero. As a result, the test run of the machining can be started. Thereafter, a measuring tool (not shown in the drawing) is used to measure the size to make sure the advancing quantity. If the advancing quantity is 0.5 mm, the boring tool 20 is advanced until such time when the graduation scale 201 has advanced to converge with the fifth graduation scale 111.

In other words, the displacement of one degree at the convergence of the graduation scale 201 and any one of the graduation scales 111 denotes a 0.1 mm advancement by the boring tool 20. As a result, various advancing quantities can be specified by the interval ratios between the graduation scale 201 and the graduation scale 111.

Figure 5C:
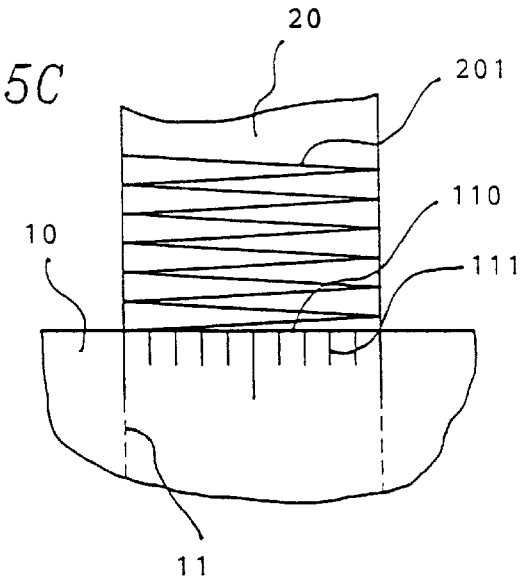
FIG. 5C shows another partial enlarged view of the present Invention as shown in FIG. 5A.

As shown in FIG. 5C, the effect described above can be also achieved by rearranging the graduation scales 201 of FIGS. 5A and 5B to be alternately and correspondingly beveled.

Figure 6:
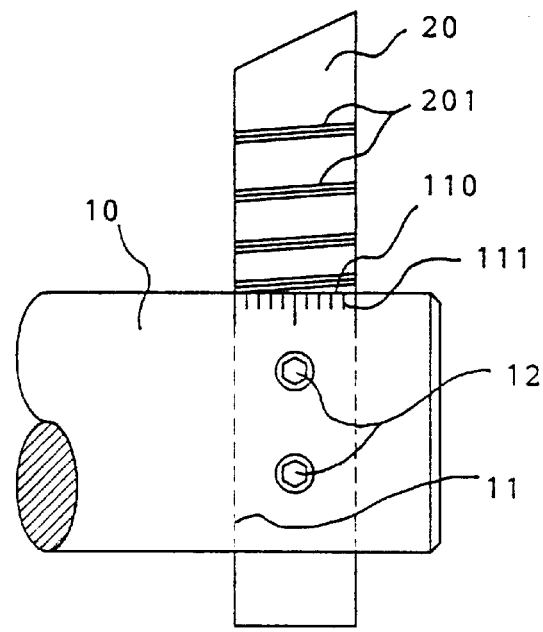
FIG. 6 shows a side plan view of a second preferred embodiment of the present invention.

As shown in FIG. 6, the graduation scale 201 of the boring tool 20 can be set up in accordance with various hole diameter data of the machining stepped hole finishing piece, so as to facilitate the microadjusting and the reading of the advancing quantities of various rough boring and finish boring.

Figure 7:
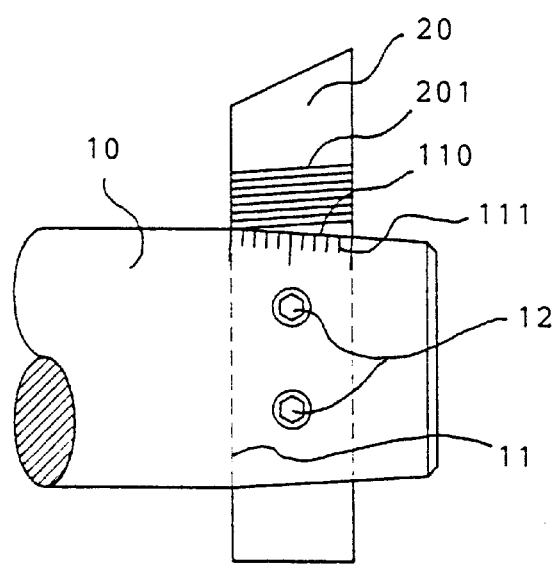
FIG. 7 shows a side plan view of a third preferred embodiment of the present invention.
Figure 8A:
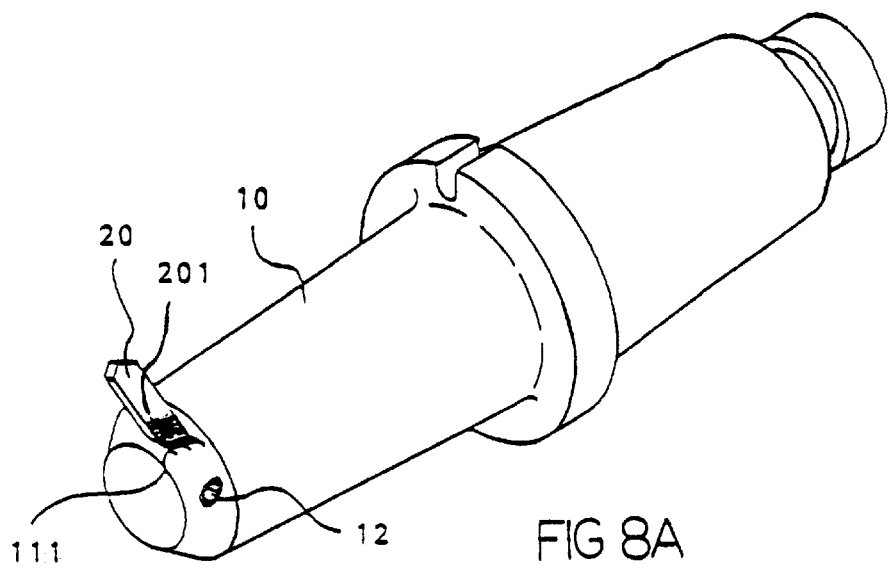
FIGS. 8A and 8B show a partial enlarged view of a fourth preferred embodiment of the present invention.
Figure 8B:
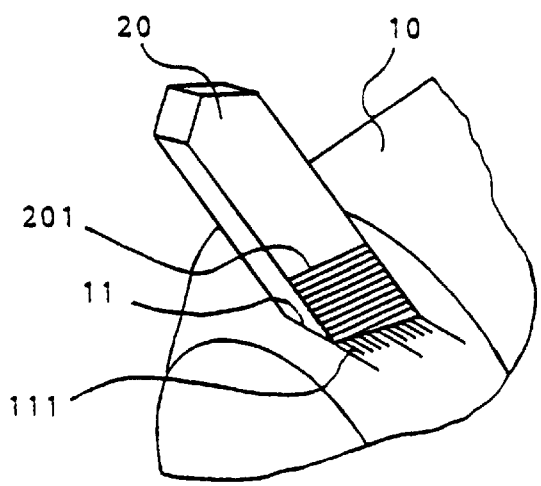

As shown in FIG. 7 and 8, the tool hole 11 portion of the boring rod 10 is tapered to have an inclination. The graduation scale 111 located at the base line 110 must be provided with a bevel in relation to the graduation scale 201 of the boring tool 20.

When the boring tool 20 is displaced in the tool hole 11, the graduation scales 201 and 111 of these two elements can be converged to provide the reading as to the hole diameter machining quantity.

Figure 9:
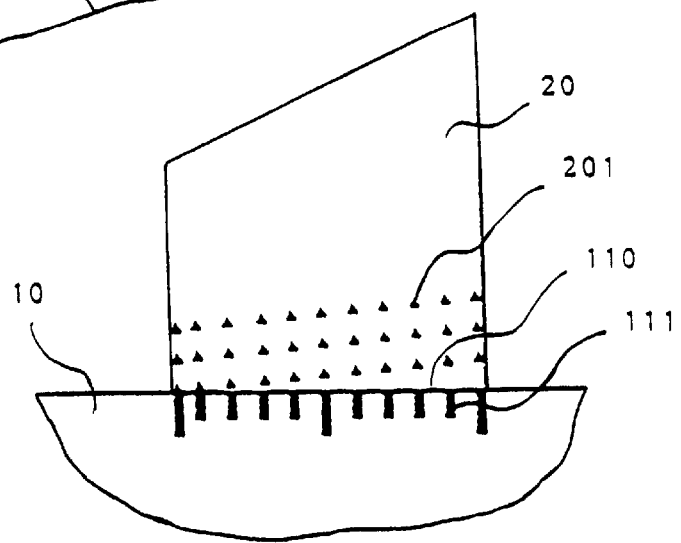
FIG. 9 shows a side plan view of a fifth preferred embodiment of the present invention.

As shown in FIG. 9, each of the graduation scales 201 of the boring tool 20 of the above embodiments may be designed as a chain of continuous dots separated by a minute interval. This design is intended to apply in the high precision or in the small scaling space for a better visual effect.

Figure 10:
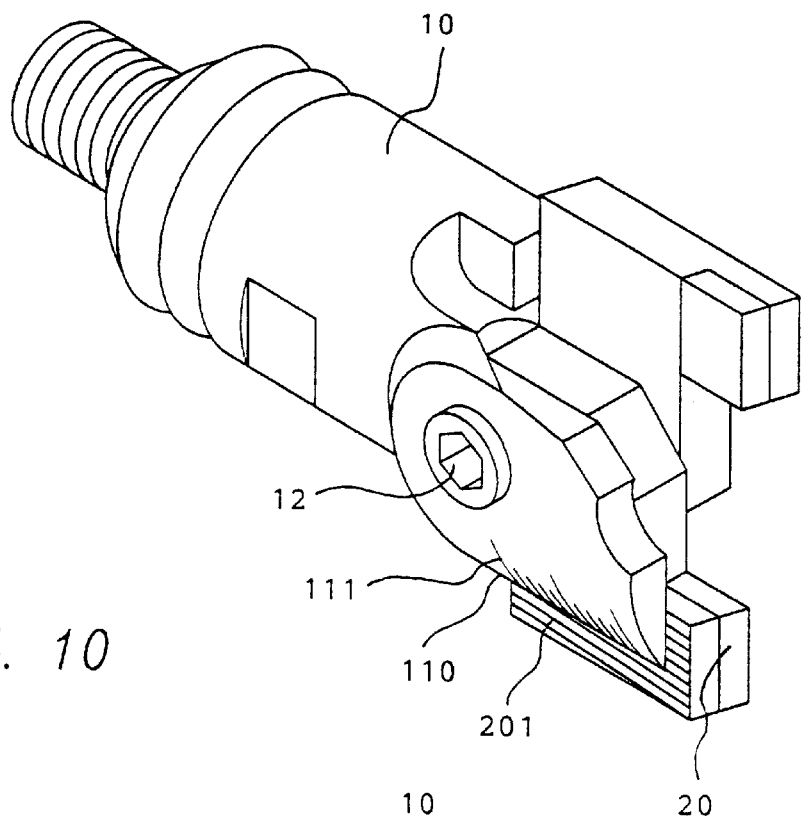
FIG. 10 shows a perspective view of a sixth preferred embodiment of the present invention.
Figure 11:
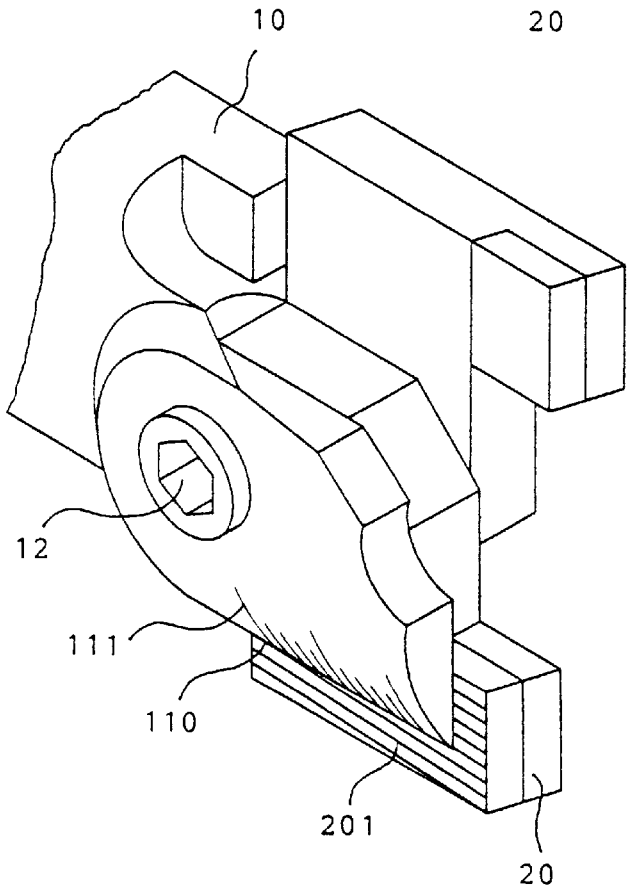
FIG. 11 shows a partial enlarged view of the sixth preferred embodiment of the present invention as shown in FIG. 10.

As shown in FIGS. 10 and 11, the same effect can be achieved by designing the graduation scales 201 and 1 11 on a boring tool different from the boring tool 20 of the present invention.

The graduation scales 201 of the present invention may be made integrally with the boring tool 20 of the present invention or marked on a separate rule (not shown in the drawing) which is then attached to the surface of the boring tool 20.

The above measuring graduation scales 201 and the reading graduation scales 111 can be designed in a straight-line form or a curved form.

The reading scales 111 may be marked directly on the surface located at the base line 110 of the boring rod 10, or on a separate rule (not shown in the drawing) which is then attached to the outer diametrical edge of the boring rod 10 or even beyond the outer diametrical edge.

What is claimed is:

1. A rough boring tool having means to show microadjustable boring hole diameter machining quantity, said rough boring tool comprising:

a boring rod provided at one end thereof with at least one tool hole;

a boring tool engaged with said tool hole; and a fastening element for securing said boring tool in said tool hole;

wherein said tool hole is provided with a base line which is in turn provided with reading graduation scales at an interval;

wherein said boring tool is provided with measuring graduation scales at an interval, said measuring graduation scales being corresponding in location to said reading graduation scales and forming an angle with said base line.

2. The rough boring tool as defined in claim 1, wherein said measuring graduation scales are arranged equidistantly or at different intervals.

3. The rough boring tool as defined in claim 1, wherein said reading graduation scales are arranged in various appropriate numbers and at various intervals.

4. The rough boring tool as defined in claim 1, wherein each of said measuring graduation scales of said boring tool is arranged in a chainlike form consisting of continuous dots at minute interval.

5. The rough boring tool as defined in claim 1, wherein said measuring graduation scales of said boring tool are marked on a rule which is then attached to the surface of said boring tool.

6. The rough boring tool as defined in claim 1, wherein said reading graduation scales of said tool hole are marked on a rule which is then attached to the surface of the end of said tool hole.

7. The rough boring tool as defined in claim 1, wherein said reading graduation scales and said measuring graduation scales are arranged in a straight-line form or a curved form.

8. The rough boring tool as defined in claim 1, wherein said base line and said reading graduation scales are located in the surface of one side edge of an outer diameter of said boring rod.

9. The rough boring tool as defined in claim 1, wherein said base line and said reading graduation scales are located beyond the side edge of an outer diameter of said boring rod such that said reading graduation scales are corresponding in location to said measuring graduation scales.

* * * * *